United States Patent [19]

Poisner

[11] Patent Number: 5,943,506
[45] Date of Patent: Aug. 24, 1999

[54] SYSTEM FOR FACILITATING DATA I/O BETWEEN SERIAL BUS INPUT DEVICE AND NON-SERIAL BUS COGNITION APPLICATION BY GENERATING ALTERNATE INTERRUPT AND SHUTTING OFF INTERRUPT TRIGGERING ACTIVITIES

[75] Inventor: David Poisner, Folsom, Calif.

[73] Assignee: Intel Corporation, Santa Clara, Calif.

[21] Appl. No.: 08/622,471

[22] Filed: Mar. 25, 1996

[51] Int. Cl.[6] ............................. G06F 13/14; H03K 17/94
[52] U.S. Cl. ...................... 395/868; 395/893; 395/838; 395/733; 341/22
[58] Field of Search ................................. 395/180, 500, 395/726, 733, 750, 800, 835, 837, 838, 869, 892, 893, 868, 735; 341/22

[56] References Cited

U.S. PATENT DOCUMENTS

| | | | |
|---|---|---|---|
| 5,437,039 | 7/1995 | Yuen | 395/725 |
| 5,509,139 | 4/1996 | Ayash et al. | 395/869 |
| 5,551,044 | 8/1996 | Shah et al. | 395/750 |
| 5,574,862 | 11/1996 | Marianetti, II | 395/200.08 |
| 5,590,312 | 12/1996 | Marisetty | 395/500 |
| 5,610,601 | 3/1997 | Lahti et al. | 341/22 |
| 5,628,029 | 5/1997 | Evoy | 395/838 |

*Primary Examiner*—Thomas C. Lee
*Assistant Examiner*—Rehana Perveen
*Attorney, Agent, or Firm*—Blakely, Sokoloff, Taylor & Zafman LLP

[57] ABSTRACT

A system management interrupt (SMI) generation circuitry is provided to a universal serial bus (USB) complaint personal computer (PC) for generating a SMI whenever the USB controller attempts to generate a data-in interrupt received response to data in from a USB compatible keyboard/pointing device, and whenever an application attempts to perform a direct data-out to the AT keyboard controller. Additionally, a SMI handler is provided to service the SMIs, rerouting the data in to the appropriate input port of the AT keyboard controller, simulating receipt of data from an attached keyboard, thereby providing the data-in to the non-USB cognition application, and rerouting the data-out to the USB controller, thereby providing the data to the targeted USB keyboard/pointing device. As a result, compatibility is maintained between a USB compatible keyboard/pointing device, and non-USB cognition applications that perform direct data-in and data-out against the keyboard controllers.

35 Claims, 10 Drawing Sheets

| | IDLE | GATE 1 | GATE 2 |
|---|---|---|---|
| IDLE | WR →→ 64h & DATA≠D1h<br>RD →→ 64h<br>WR →→ 60h<br>RD →→ 60h | WR →→ 64h & DATA=D1h | N/A |
| GATE 1 | WR →→ 64h & DATA≠D1h<br>RD →→ 60h | WR →→ 64h & DATA=D1h<br>RD →→ 64h | WR →→ 60h |
| GATE 2 | WR →→ 64h<br>WR →→ 60h<br>RD →→ 60h | N/A | RD →→ 64h |

FIG. 9

SYSTEM FOR FACILITATING DATA I/O BETWEEN SERIAL BUS INPUT DEVICE AND NON-SERIAL BUS COGNITION APPLICATION BY GENERATING ALTERNATE INTERRUPT AND SHUTTING OFF INTERRUPT TRIGGERING ACTIVITIES

BACKGROUND OF THE INVENTION

1. Field of the Invention

The present invention relates to the field of computer systems. More specifically, the present invention relates to the art of maintaining compatibility for a non-universal serial bus (USB) cognition application on a computer system having a USB keyboard/pointing device and the like.

2. Background Information

Virtually all "IBM compatible" personal computers (PCs) include what is known in the art as an AT keyboard controller for facilitating data input/output (I/O) between a keyboard/pointing device and an executing application. Data are input from and output to the keyboard/pointing device through what is known as port 60*h* and port 64*h* of the AT keyboard controller.

In its continuous strive to improve the usability of PCs, the PC industry has recently adopted the USB standard for interfacing I/0 peripherals such as the keyboard and the mouse to the "main" system. Among other things, the standard calls for a USB controller to control the overall operation of the serial bus, to which USB standard compliant I/O peripherals are attached and operate in a prescribed manner. The standard further calls for the abstraction of the functions provided by the USB controller into a set of controller services, and the provision of a layer of serial bus services for servicing client applications. In other words, in a USB compliant world, data I/0 between a client application and a USB compliant I/O peripheral are performed through the USB compliant serial bus services and controller services. Thus, a traditional application that performs data I/O with a keyboard/pointing device through direct read and write of the AT keyboard controller will not be able to execute properly in the USB world without modification. Therefore, it would be desirable if backward compatibility can be maintained, without modification to either the USB controller or the non-USB cognition "old style" application. It would be also desirable if the backward compatibility can be maintained with similar performance in timing. As will be disclosed in more detail below, the present invention advantageously achieves these and other desired results.

For further information on the USB standard, see Universal Serial Bus, version xx, published by Intel Corporation, Santa Clara, Calif.

SUMMARY OF THE INVENTION

System Management Interrupt (SMI) generation circuitry is provided to a USB complaint PC for generating a SMI whenever the USB controller attempts to generate a data-in interrupt received response to data in from a USB compliant keyboard/pointing device, and whenever an application attempts to perform a direct data-out to the AT keyboard controller. Additionally, a SMI handler is provided to service the SMIs. In the data-in case, upon determining the cause, the SMI handler reroutes the data to the appropriate input port of the AT keyboard controller, simulating receipt of data from an attached keyboard. In response, the AT keyboard controller triggers a conventional interrupt providing the data to the non-USB cognition application. In the data-out case, upon determining the cause, the SMI handler reroutes the data to the USB controller to provide the data to the targeted USB keyboard/pointing device.

Preferably, the SMI generation circuitry includes a pass-thru mode of operation, under which SMIs are not generated for data-outs of certain predetermined key sequences. In one embodiment, the pass-through mode is enabled for the A20gate sequence, and the pass-through mode is effectuated by temporarily disabling the SMI generation circuitry, and reenabling it after data out of the A20gate sequence have been written into the AT keyboard controller.

BRIEF DESCRIPTION OF DRAWINGS

The present invention will be described by way of exemplary embodiments, but not limitations, illustrated in the accompanying drawings in which like references denote similar elements, and in which:

FIGS. 8–9 illustrates the states and state transitional rules of the state machine of FIG. 5;

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, in describing the method steps of the present invention, certain operations are described with multiple method steps, however, unless specifically described, it should not be construed that these method steps are necessarily ordered dependent in their performance.

Figure 1:
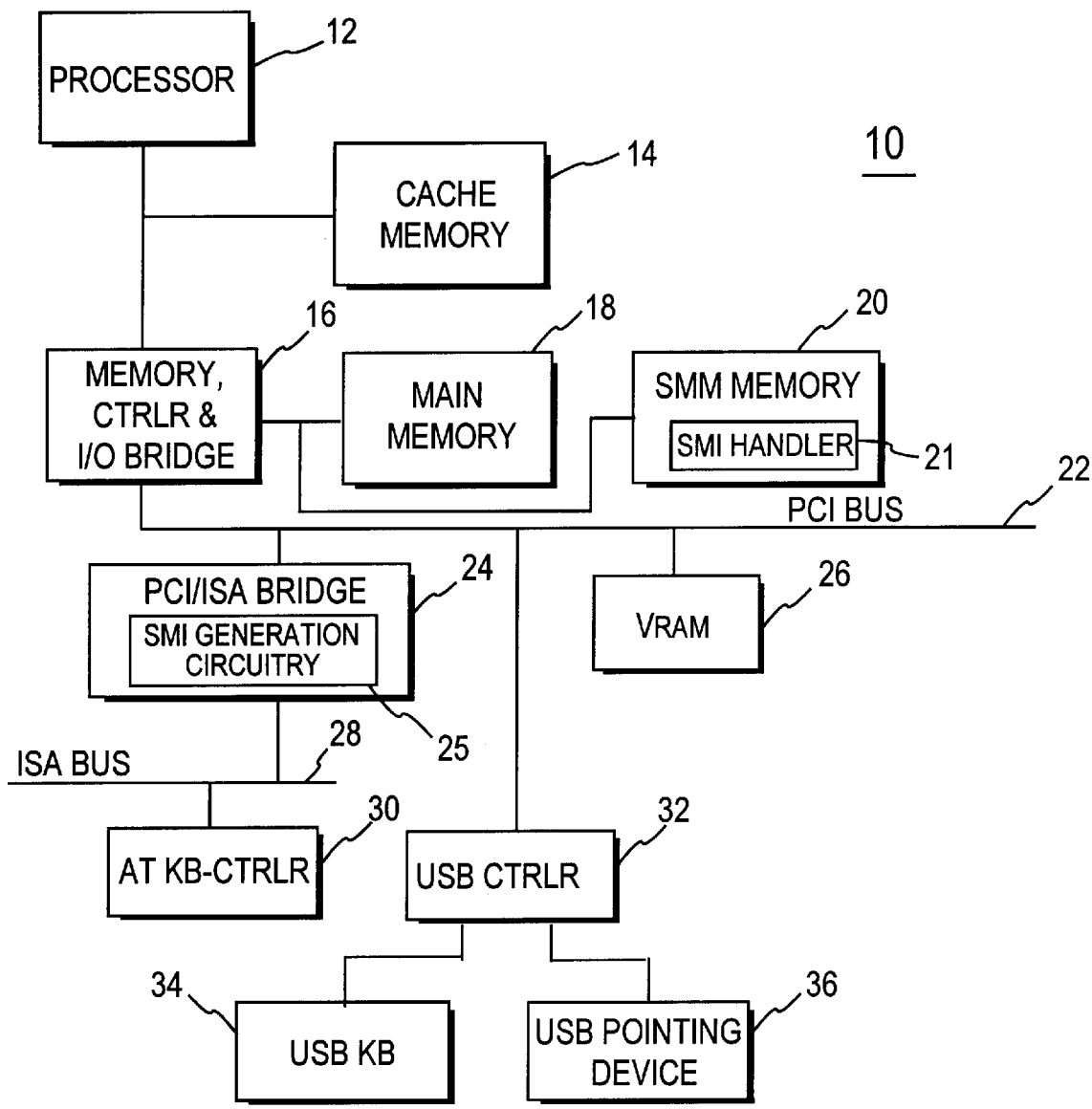
FIG. 1 illustrates an exemplary USB compliant computer system incorporated with the teachings of the present invention.

Referring now to FIG. 1, an exemplary USB compliant computer system incorporated with the teachings of the present invention is shown. Exemplary computer system 10 includes in particular USB compliant controller 32, USB keyboard 34, and USB pointing device 36, coupled to each other as shown. For the illustrated embodiment, USB controller 32 is coupled to Peripheral Component Interconnect (PCI) bus 22. Coupled also to PCI bus 22 is improved PCI/Industry Standard Architecture (ISA) bridge 24, VRAM 26 and memory controller and I/O bridge 16. Connected to the other side of PCI/ISA bridge 24 is ISA bus 28, which in turn is connected to Advanced Technology (AT) style bus controller 30. Improved PCI/ISA bridge 24 includes System Management Interrupt (SMI) generation circuitry 25 of the present invention. Coupled to memory controller and I/O bridge 16 are processor 12, cache memory 14, main memory 18 and System Management Mode (SMM) memory 20. SMM memory 20 (upon system initialization) stores improved System Management Interrupt (SMI) handler 21 of the present invention. In one embodiment, with the exception of USB keyboard 34 and USB pointing device 36, all other elements 12–30 are disposed on a motherboard (not shown), i.e. either an integral part of the motherboard, surface mounted to the motherboard, or interconnected to the motherboard through sockets or connectors.

Processor 12 is equipped to support multiple modes of execution, including in particular the above mentioned SMM, under which system management functions can be performed in a manner that is transparent to the executing operating system and applications. As will be described in more detail below, the present invention advantageously leverages on this capability to cause keyboard and pointing device data to be properly rerouted between USB controller 32 and AT keyboard controller 30, thereby achieving the desired backward compatibility for the non-USB cognition "old style" applications. Processor 12 enters into SMM in response to the above mentioned SMI, which is an unmaskable interrupt. Otherwise, processor 12 performs conventional processor functions, and may be constituted in a number of well known manners. Similarly, memory controller and I/O bridge 16, cache memory 14 and main memory 18 perform their conventional functions, and are intended to represent a broad category of these elements known in the art.

Besides SMI handler 21, SMM memory 20 is used to store the system state when processor 12 enters SMM. SMM memory 20 is normally not mapped as part of the system management space, except when processor 12 enters SMM, at which time, SMI handler 21 is given control. SMI handler 21 services the SMI, including a SMI generated for the purpose of rerouting keyboard and pointing device data in accordance with the present invention, to be more fully described below. Upon servicing the SMI, SMI handler 21 causes processor 12 to resume its normal mode of execution.

In addition to the conventional function of bridging bus cycles between PCI bus 22 and ISA bus 28, PCI/ISA bridge 24, through SMI generation circuitry 25, monitors for keyboard and pointing device data movement from USB controller 32 and data movement to AT keyboard controller 30, and in response, generates SMIs to cause the keyboard and pointing device data to be properly rerouted. Preferably, SMI generation circuitry 25 is equipped to allow a pass-through mode of operation, under which a predetermined key sequence, such as the key sequence known as the A20gate sequence in the art, is allowed to pass-through to the AT keyboard controller 30 without being redirected to USB controller 32.

USB controller 32, USB keyboard 34, and USB pointing device 36 perform their respective controller, keyboard and pointing functions in accordance with the USB standard. They may be constituted in a variety of manners that are readily apparent to those skilled in the art. All other elements, including PCI bus 22, VRAM 26, ISA bus 28, and AT keyboard controller 30 perform their respective conventional functions. Elements 22 and 26–30 are also intended to represent a broad category of these elements known in the art.

Before proceeding to explain the present invention in further detail, it should be noted that for ease of explanation, the present invention is being described with the illustrated embodiment having SMI generation circuitry 25 integrated into PCI/ISA bridge 24. However, from the description to follow, those skilled in the art will appreciate that the present invention may be practiced with SMI generation circuitry 25 collectively or distributively packaged or disposed in a variety of manners. Additionally, the present invention may be practiced on computer systems with some of the enumerated elements packaged/interconnected differently, without some of the enumerated elements or with other additional elements. For examples, USB controller 32 may be packaged as an integral part of PCI/ISA bus bridge 24, AT keyboard controller 30 may be emulated with additional circuitry inside PCI/ISA bridge 24, VRAM 26 may be removed, and additional circuitry for generating a SMI for other reasons may be added.

Figure 2:
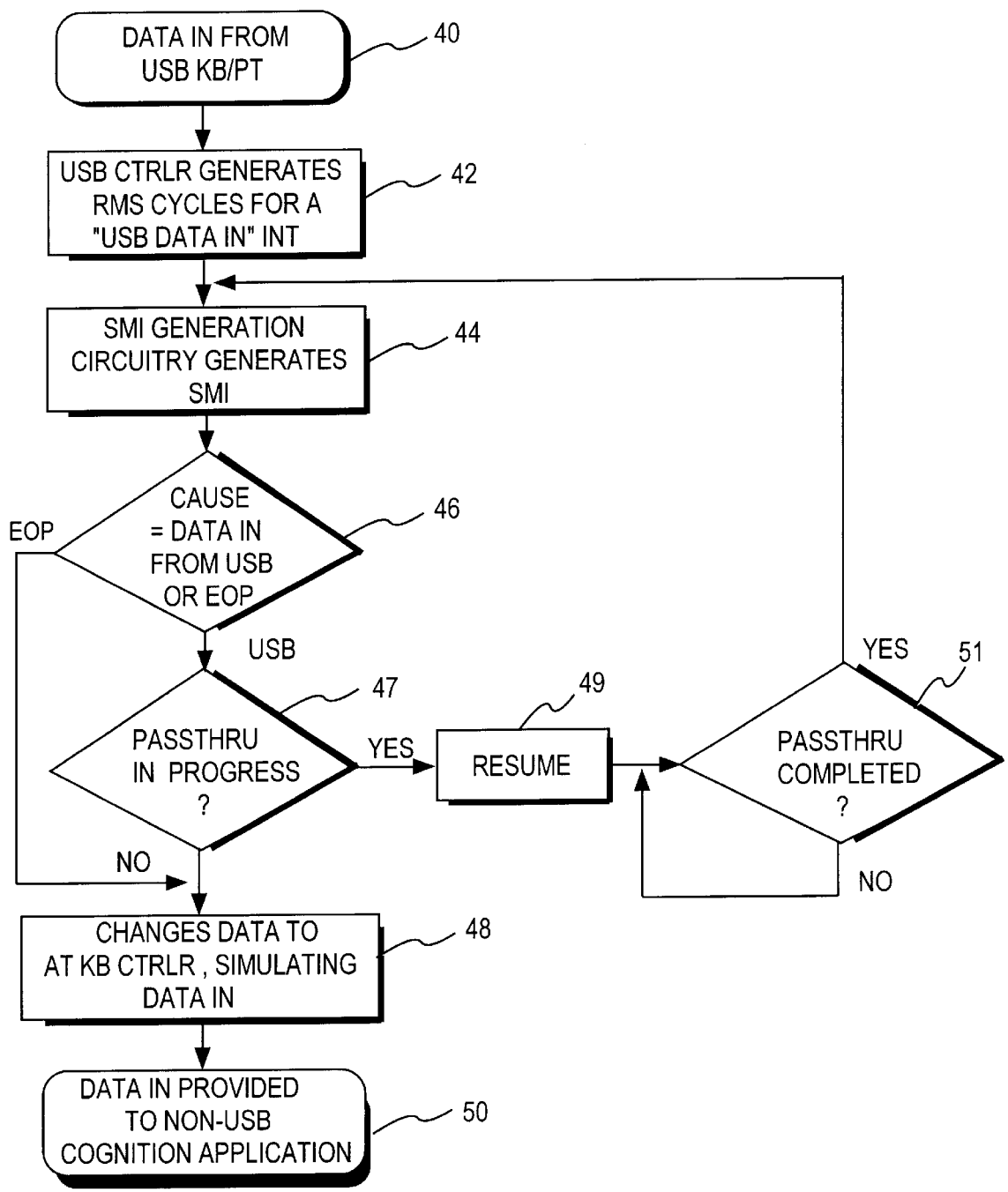
FIGS. 2–3 illustrate the method steps of the present invention.

Now, the overall method steps of the present invention will first be described, referencing FIGS. 2–3. As illustrated by FIG. 2, in response to data-in from USB keyboard 34 or pointing device 36, event 40, USB controller 32 generates bus cycles to trigger a "USB data-in" interrupt, step 42. Upon detection of the bus cycles, SMI generation circuitry 25 generates a SMI, step 44. As discussed earlier, in response, processor 12 enters SMM, SMM memory 20 is mapped as part of the memory space, and SMI handler 21 is given control. Upon being given control, SMI handler 21 determines the cause of the SMI, step 46. In an embodiment where the pass-through mode of operation is not supported, SMI handler 21 proceeds to step 48 directly, and channels the keyboard/pointing device data to AT keyboard controller 30, using AT commands that simulate provision of keyboard/pointing device data from an actual keyboard/pointing device, step 48. In response, AT keyboard controller 30 generates a conventional "AT data-in" interrupt, step 48. In due course, the keyboard/pointing device data is provided to the non-USB cognition application, event 50 (in one embodiment, by the basic I/O service (BIOS) of computer system 10).

However, in an embodiment where the pass-through mode of operation is supported, back at step 46, SMI handler 21 also determines whether the SMI is caused by end of pass-through mode. If the SMI cause is data-in from USB controller 32, SMI handler 21 further determines if a pass through is still in progress, step 47. If a pass through is not in progress, then SMI handler 21 proceeds to step 48 as described before, otherwise SMI handler 21 causes processor 12 to resume its normal mode of operation, step 49. While processor 12 operates in normal mode, SMI generation circuitry 25 monitors for end of pass-through mode, step 51. Upon detecting end of pass-through mode SMI generation circuitry 25 generates another SMI (with end of pass-through mode as the cause), step 44. At step 46, SMI handler 21 determines that the SMI cause is end of pass-through mode. SMI handler 21 then proceeds to step 48 directly, as described earlier.

Figure 3:
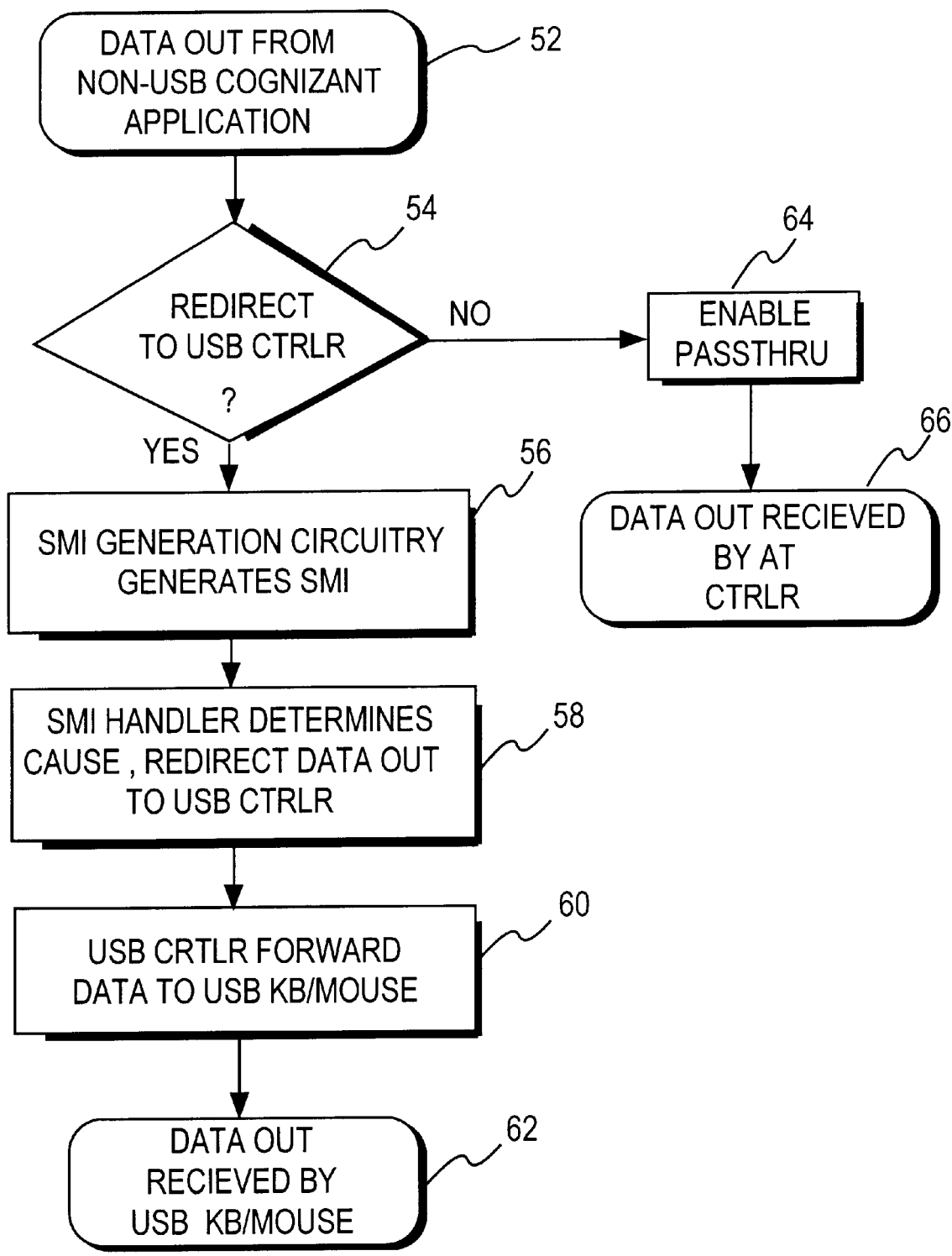

In the case of data-out from the non-USB cognition application, event 52, FIG. 3, for the illustrated embodiment, as shown, SMI generation circuitry 25 determines whether the outbound data should be redirected to USB controller 32, step 54. If the outbound data are among those data that should be redirected, SMI generation circuitry 25 generates a SMI, step 56. In like manner, upon being given control, SMI handler 21 determines the cause of the SMI, and redirects the keyboard/pointing device data to USB controller 32, step 58. In response, USB controller 32 forwards the data to USB keyboard/pointing device 34/36, step 60, thereby providing the data to USB keyboard/pointing device 34/36, event 62.

Back at step 54, if it is determined that the outbound data should not be redirected to USB controller 32, SMI generation circuitry 25 dynamically enables a pass-through mode of operation, step 64, thereby allowing the outbound data to flow through to AT keyboard controller 30, event 66.

Figure 4:
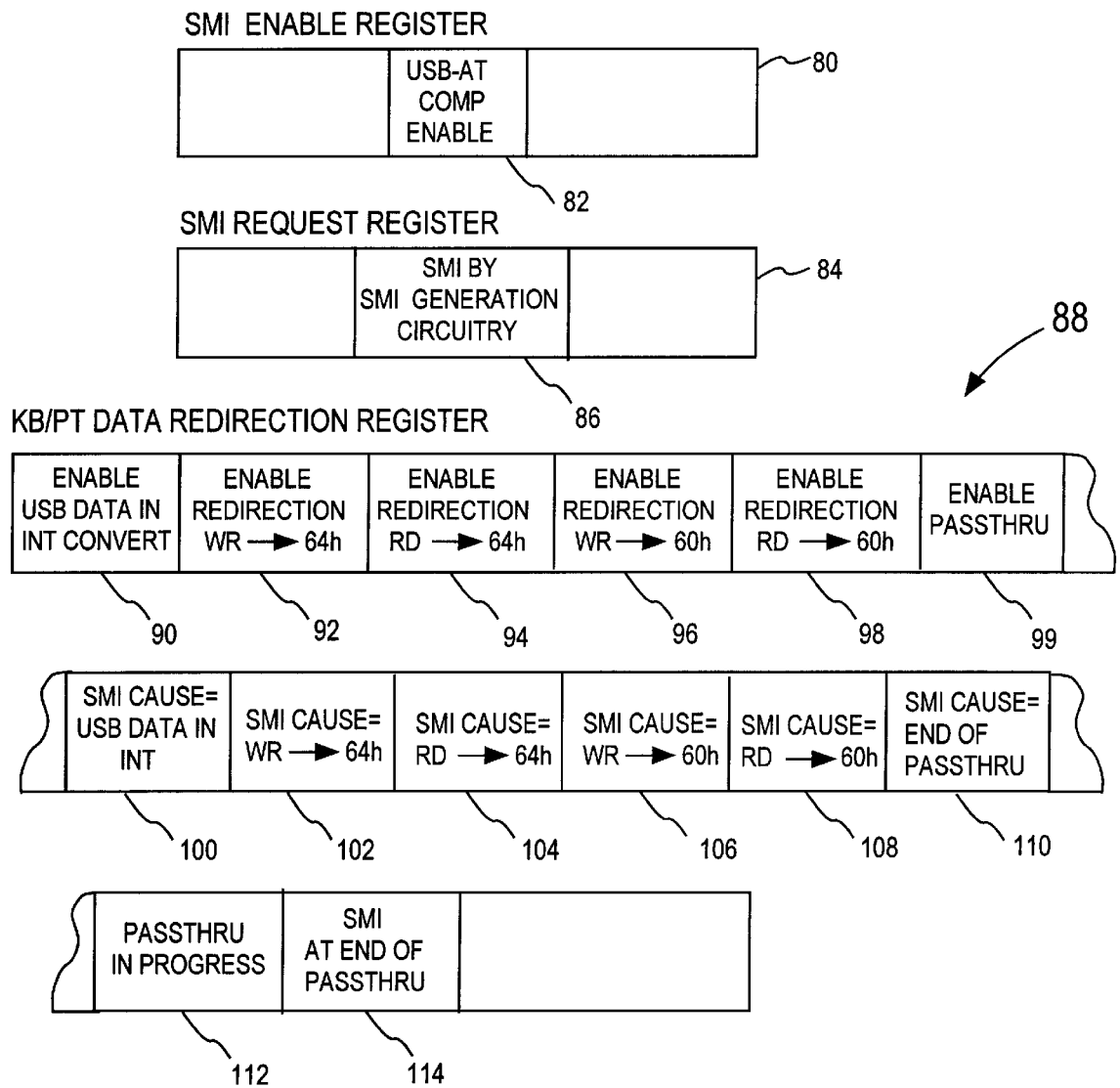
FIG. 4 illustrates the content of a plurality of registers employed by the present invention.

FIG. 4 illustrates a number of control registers employed by one embodiment of the present invention to implement the above described method steps. As shown, these control registers include a SMI enable register 80, a SMI request register 84, and a keyboard/pointing device data redirection register 88 (hereinafter simply redirection register). In one implementation, registers 80, 84 and 88 are disposed in PCI/ISA bridge 24 and mapped into PCI configuration address space, however other placement and mapping may be employed. Furthermore, alternative storage means may be employed to retain and share the relevant control information.

For the purpose of the present invention, SMI enable register 80 includes in particular a USB-AT compatibility enable bit. Setting the bit denotes enabling of the essential elements of the present invention to provide the desired backward compatibility for the non-USB cognition applications, thus allowing the compatibility mode of operation to be selectively turned on or off. SMI request register 84 includes in particular a SMI source bit 86. Setting the SMI source bit denotes a SMI as being triggered by SMI generation circuitry 25, thus allowing other SMI generation circuitry for generating SMIs for other reasons to be included in computer system 10.

Redirection register 88 includes a plurality of enable bits 90–99. Enable bit 90 enables the generation of a SMI for USB data-in. Enable bits 92–98 enable redirection for write to port 64h, read from port 64h, write to port 60h, and read from port 60h respectively, ports 64h and 60h being ports of AT keyboard controller 30. Enable bit 99 enables SMI generation circuitry 25 to operate in the pass-through mode. Redirection register 88 further includes a plurality of SMI cause bits 100–110. SMI cause bits 100–108 denote the cause of a SMI is USB data in, write to port 64h, read from port 64h, write to port 60h, and read from port 60h respectively. SMI cause bit 110, when set, denotes the SMI is caused by end of a pass-through operation. Finally, redirection register 88 further includes a plurality of status bits 112–114. Status bit 112 denotes that certain predetermined data are currently being allowed to pass through to AT keyboard controller 30, whereas status bit 114 denotes the necessity to trigger a SMI at the end of the pass through operation 10 (which arises when a USB data-in event occurs while data pass through is in progress).

Figure 5:
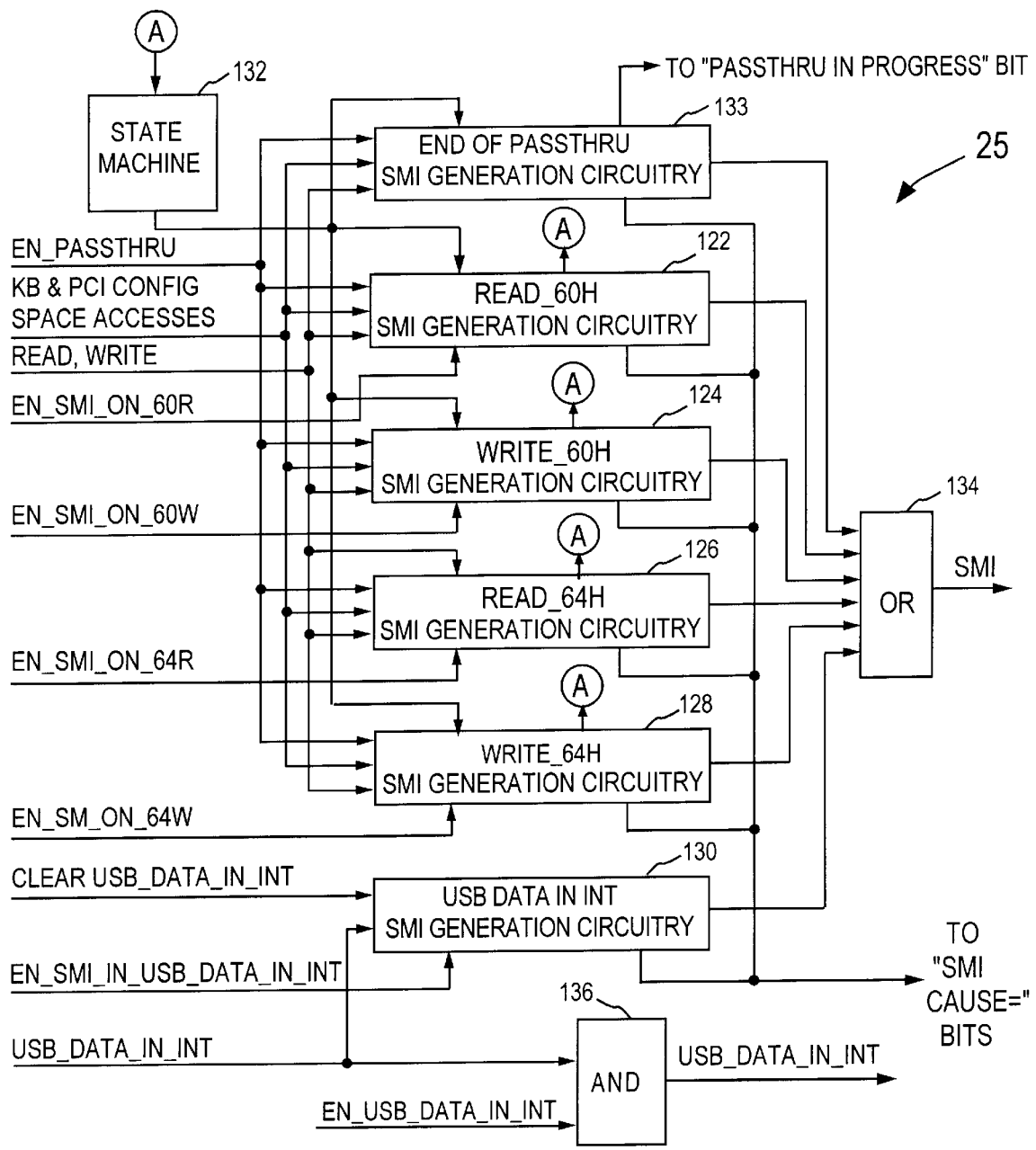
FIG. 5 illustrates one embodiment of the SMI generation circuitry of the present invention.

FIG. 5 illustrates one embodiment of SMI generation circuitry 25. For the illustrated embodiment, SMI generation circuitry 25 includes a number of specific SMI generation circuitry 122–130, and 133, and state machine 132, coupled to each other as shown. The outputs of the specific SMI generation circuitry 122–130, and 133 are coupled to OR gate 134. Additionally, SMI generation circuitry 25 includes AND gate 136. Specific SMI generation circuitry 122–130 are used to generate a SMI for write to port 64h, read from port 64h, write to port 60h, read from port 60h, and USB data in respectively. State machine 132 is used to enable and control the pass-through mode of operation, whereas SMI generation circuitry 133 is used to conditionally generate a SMI at the end of a pass through operation. The usage of OR gate 134 is self-explanatory, whereas AND gate 136 is used to "shut off" the bus cycles generated by USB controller 32 in response to input keyboard/pointing device data.

Figure 6:
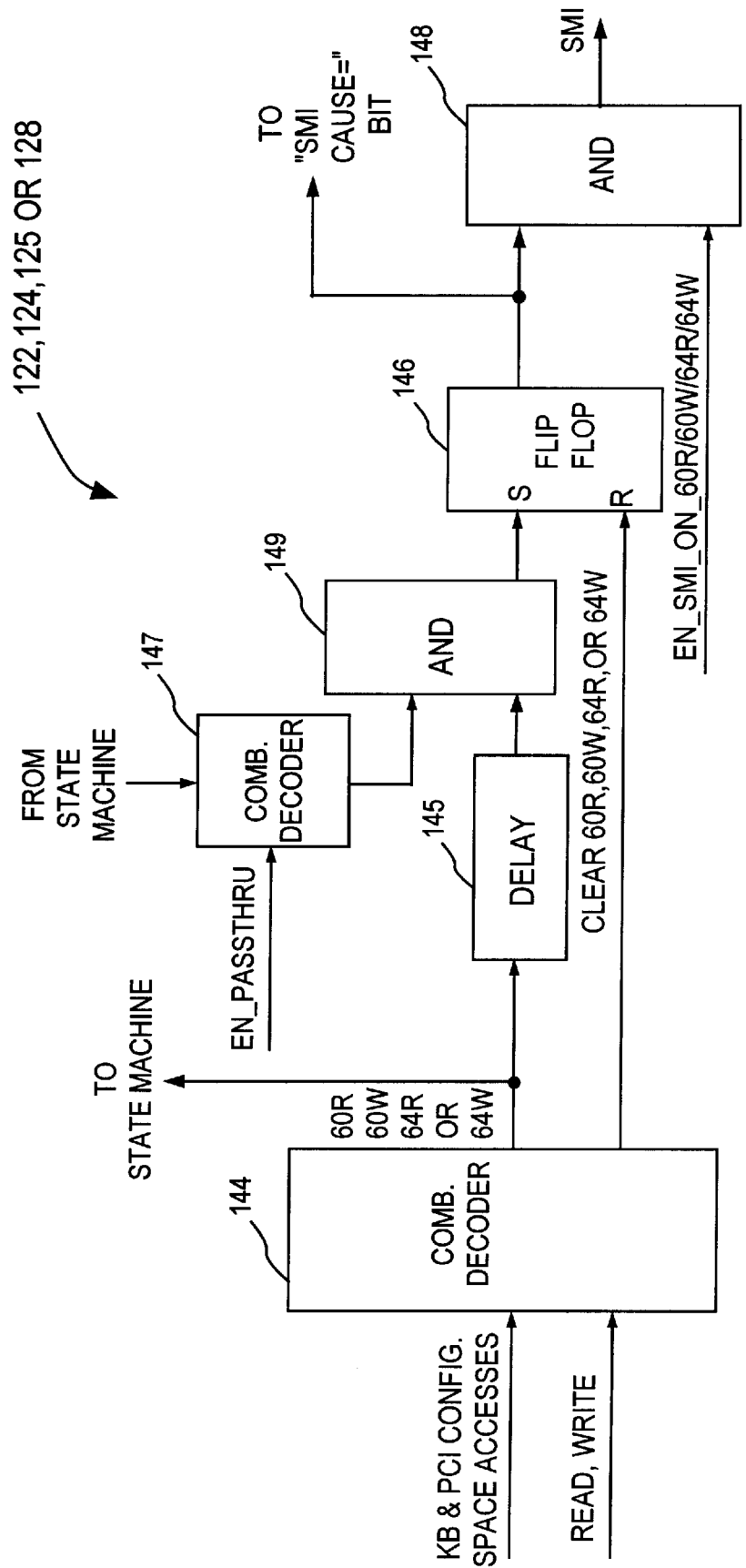
FIG. 6 illustrates one representative embodiment of read_60*h*, write_60*h*, read_64*h*, and write_64*h* SMI generation circuitry of FIG. 5 in further detail.

For the illustrated embodiment, specific SMI generation circuitry 122–128 are similarly constituted. FIG. 6 illustrates one embodiment in further detail. As shown, specific SMI generation circuitry 122, 124, 126, or 128 (hereinafter 120s) includes combinatorial decoders 144 and 147, delay element 145, SR flip flop 146 and AND gates 148 and 149, coupled to each other as shown. Combinatorial decoder 144 receives keyboard and PCI configuration space accesses, and read/write signals (decoded from bus cycles by PCI/ISA bridge 24) as inputs. In response, combinatorial decoder 144 decodes the inputs, and outputs either a read/write port 60h/64h signal or a clear read/write port 60h/64h signal, if the received inputs contain the corresponding access. Combinatorial decoder 147 receives enable pass-through mode bit 99 and the state of state machine 132 as inputs. In response, combinatorial decoder 147 outputs an enable signal if either enable pass-through mode bit 99 is not set to enable, or state machine 132 is in one of the pass through states. Delay element 145 is used to delay the read/write port 60h/64h signal, so that AND gate 149 gates the read/write port 60h/64h with an enable signal output by combinatorial decoder 147 that takes into account the read/write port 60h/64h signal. SR flip flop 146 stores the read/write port 60h/64h signal, and in turn outputs it for the appropriate SMI cause bit in redirection register 88 described earlier, and AND gate 148. AND gate 148 also receives the corresponding enable signal (enable bits 92–98) from redirection register 88, and outputs the SMI trigger signal if the corresponding enable signal is set to enable.

In other words, for the illustrated embodiment, pass-through mode is achieved by dynamically suppressing the redirection through dynamic temporary suppression of the generation of SMI, using delay element 145, combinatorial decoder 147 and AND gate 149.

Figure 7:
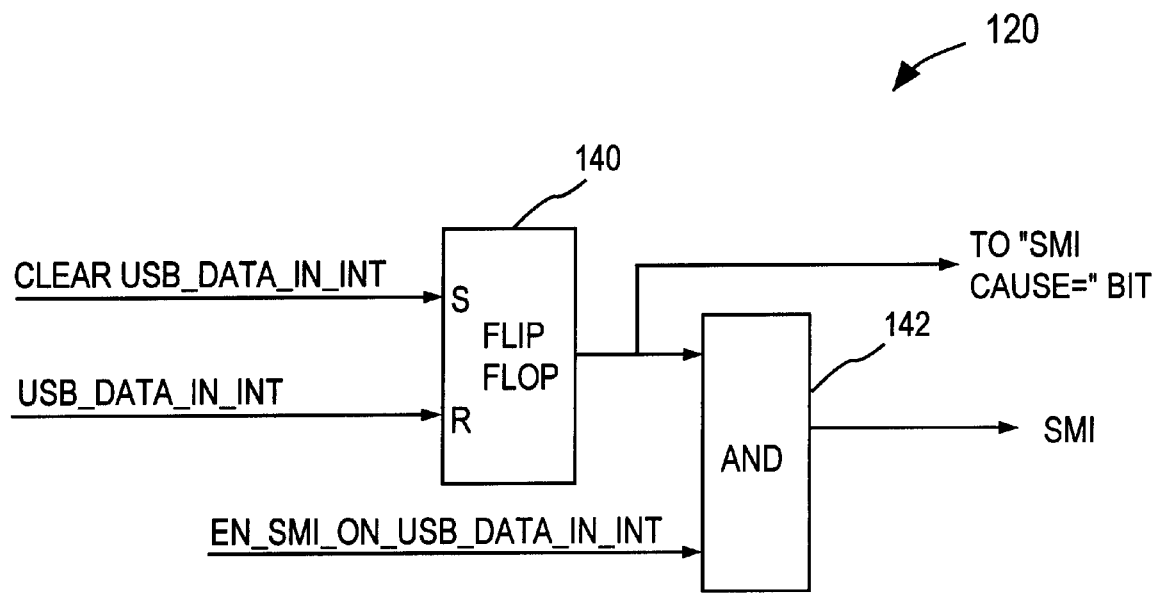
FIG. 7 illustrates one embodiment of the USB data in SMI generation circuitry of FIG. 5 in further detail.

FIG. 7 illustrates USB data-in SMI generation circuitry 130 in further detail. As shown, USB data-in SMI generation circuitry 130 comprises SR flip flop 140 and AND gate 142. SR flip flop 140 receives either the bus cycle signal for a USB data-in interrupt generation or clearing USB data-in as input. In turn, the output of SR flip flop 140 is provided to the appropriate SMI cause bit in redirection register 88 described earlier, and AND gate 142. AND gate 142 also receives the corresponding enable signal (enable bit 90) from redirection register 88, and outputs the SMI trigger signal if the corresponding enable signal is set to enable.

Figure 8:
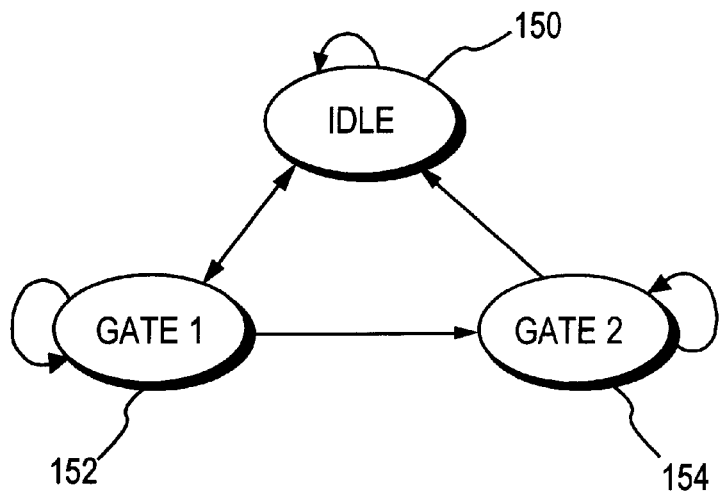

FIGS. 8–9 illustrate state machine 132 in further detail. As shown in FIG. 8, state machine 132 has three states, idle state 150, gate1 state 152 and gate2 state 154. SMI generation circuitry 25 is in pass-through mode of operation when state machine 132 is in a non-idle state, i.e., either gate1 state 152 or gate2 state 154. At idle state 150, state machine 132 either remains in idle state 150 or transitions to gate1 state 152. At gate1 state 152, state machine 132 may remain in gate1 state 152, transition to gate2 state 154 or return to idle state 150. At gate2 state 154, state machine 132 either remains in gate2 state 154, or goes to idle state 150.

More specifically, as shown in FIG. 9, at idle state 150, state machine 132 remains in idle state 150 if the bus cycles are for read/write port 60h, read port 64h, or write port 64h with data not equal to D1h. State machine 132 transitions from idle state 150 to gate1 state 152 if the bus cycles are for write port 64h with data equal to D1h. At gate1 state 152, state machine 132 remains in gate1 state 152 if the bus cycles are for write port 64h with data equal to D1h, or read port 64h. State machine 132 goes to gate2 state 154 if the bus cycles are for write port 60h, and state machine 132 returns to idle state 150 if the bus cycles are for write port 64h with data not equal to D1h, or read port 60h. At gate2 state 154, state machine 132 remains in gate2 state 154 if the bus cycles are for read port 64h, and goes to idle state 150 if the bus cycles are for write port 64h or read/write port 60h.

Figure 10:
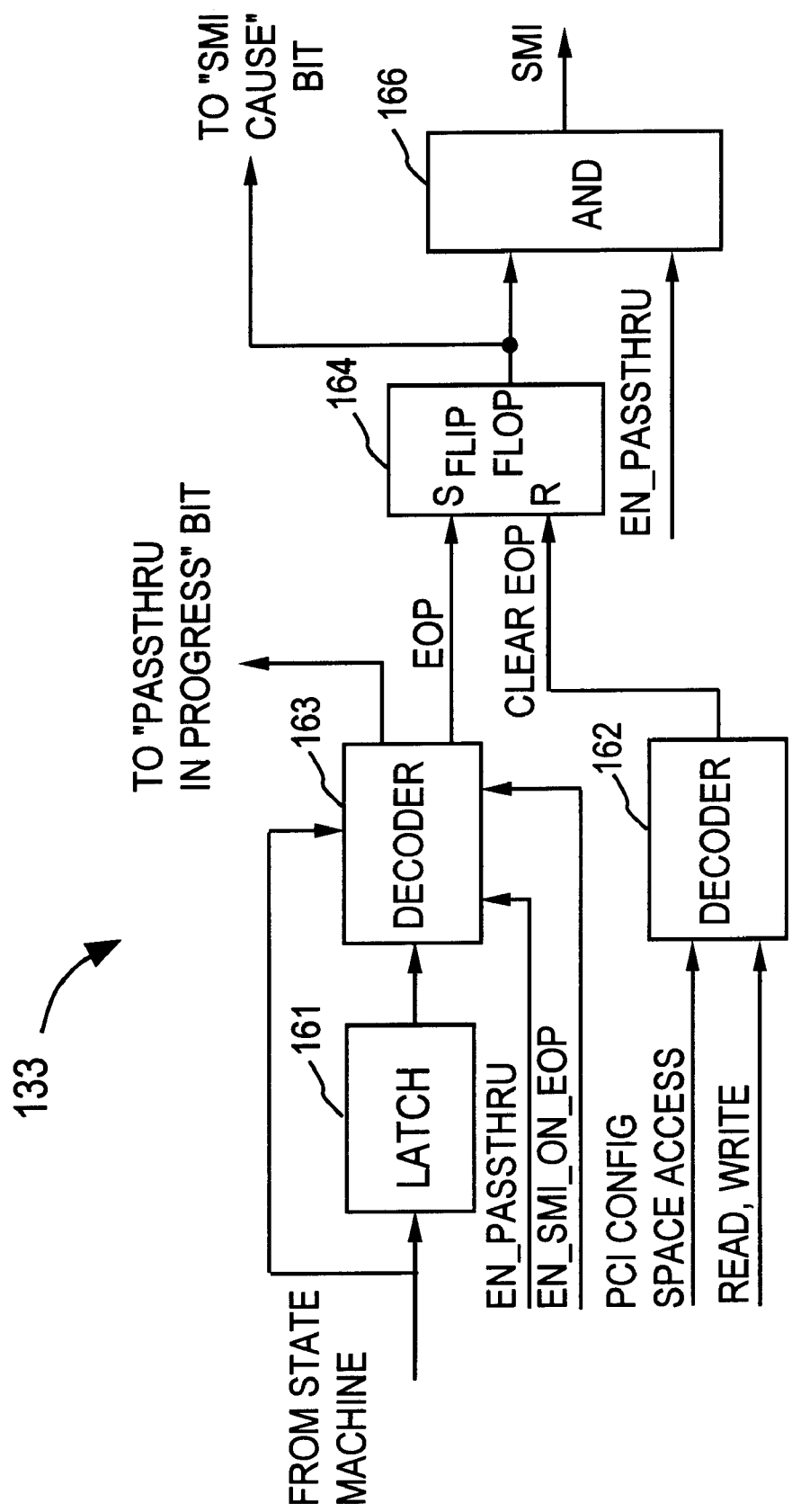
FIG. 10 illustrates one embodiment of the end of pass-through SMI generation circuitry of FIG. 5 in further detail.

FIG. 10 illustrates one embodiment of the end of pass-through SMI generation circuitry, which is similarly constituted as the read__60h, write__60h, read__64h and write__64h SMI generation circuitry. End of pass-through SMI generation circuitry 133 includes latch 161, combinatorial decoders 162 and 163, SR flip flop 164, and AND gate 166. Latch 161 stores the prior state of state machine 132. The prior state, in conjunction with the current state, the enable pass-through signal, and enable on end of pass-through operation are provided to combinatorial decoder 163. In response, combinatorial decoder 163 outputs a signal to set and reset the "pass through in progress" bit in redirection register 88, when state machine 132 transitions from the idle state to the first pass-through state (i.e., gate1), and when state machine 132 transitions from the last pass-through state (i.e. gate 2) back to the idle state. Additionally, for the later case, combinatorial decoder 163 further outputs the end of pass through (EOP) signal for SR flip flop 164. Similarly, the output of SR flip flop 164 is provided to set and reset the "SMI cause=end of pass through" bit in redirection register 88, and gate with the enable pass through signal to generate the SMI. Combinatorial decoder 162 receives the keyboard and PCI configuration space accesses and the read/write signal. In response, combinatorial decoder 162 outputs the clear end of pass through signal for SR flip flop 164 if the received inputs contain an access to redirection register 88 to clear the corresponding SMI cause bit.

Figure 11:
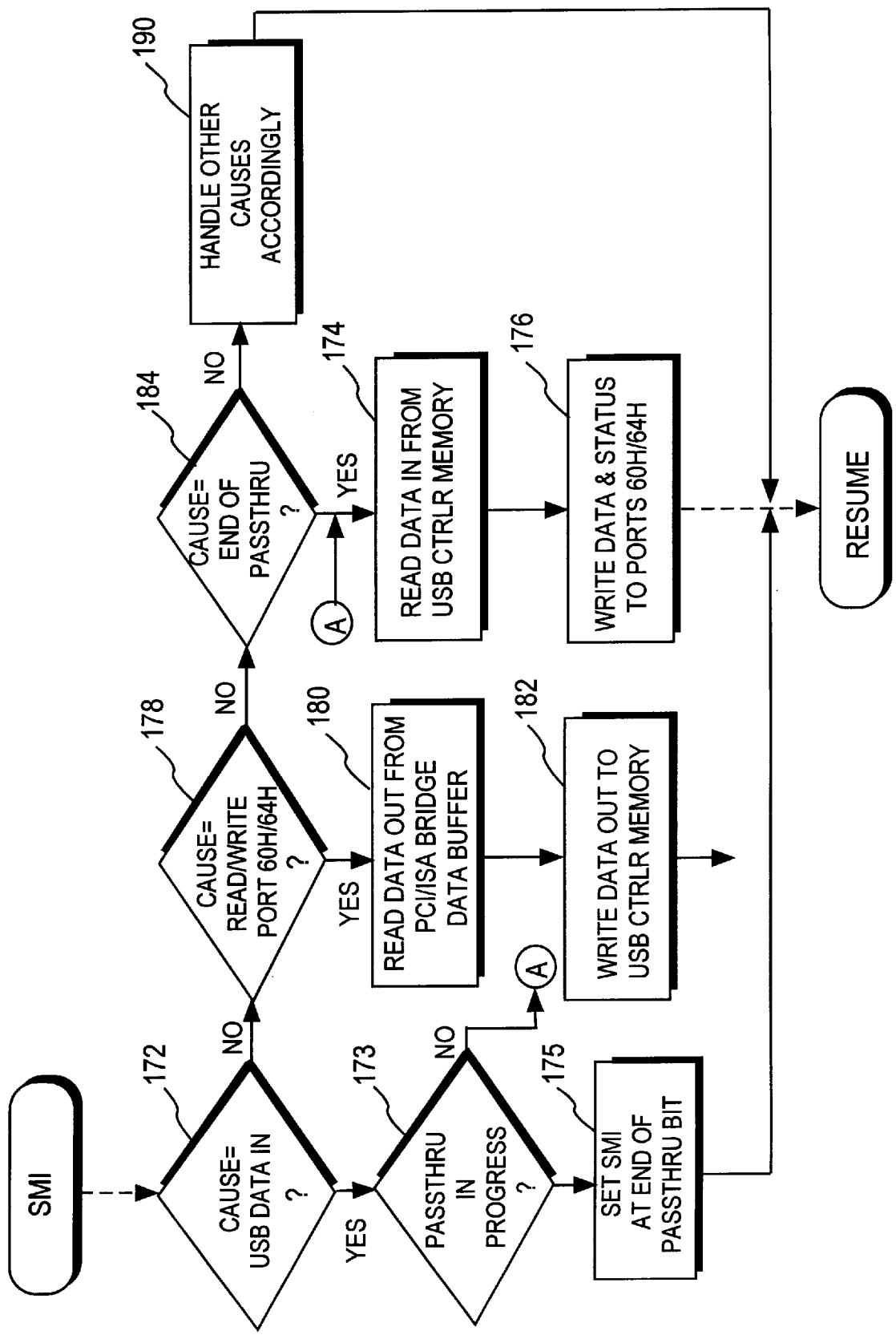
FIG. 11 illustrates one embodiment of the operational steps of the SMI handler.

FIG. 11 illustrates one embodiment of the operational steps of SMI handler 21. As shown, upon being given control, after "set up", SMI handler 21 determines if the SMI is caused by USB data-in, by examining the appropriate "SMI cause" bit in redirection register 88, step 172. If the SMI is caused by USB data-in, SMI handler 21 further determines if pass through is in progress, by examining the appropriate status bit in redirection register 88, step 173. If pass through is not in progress, SMI handler then reads the data in from the working memory of USB controller 32, step 174. (Note that the working memory of USB controller 32 is not necessarily in USB controller 32, it may be in main memory 18.) Upon reading the data-in, SMI handler 21 writes the data and status to ports 60h and 64h of AT keyboard controller 30 using AT commands that simulate as if the data were received from an actual keyboard/pointing device, step 176.

However, back at step 173, if it is determined that pass through is in progress, SMI handler 21 sets the "SMI at end of pass through" bit in redirection register 88 to denote the necessity to generate the SMI at the end of the pass through operation, step 175. As described earlier, the setting of the "necessity" bit will cause a new SMI to be generated again, when the current pass through operation completes.

Back at step 172, if the SMI is not caused by USB data-in, SMI handler 21 further determines if the SMI is caused by bus cycles for read/write port 60h/64h, by examining the appropriate "SMI cause" bits in redirection register 88, step 178. If bus cycles for read/write port 60h/64h is the SMI cause, SMI handler 21 reads the data out from the appropriate data buffer in PCI/ISA bridge 24, step 180, and writes the data into the working memory of USB controller 32, step 182.

Back at step 184, if the SMI is not caused by bus cycles for read/write to port 60h/64h SMI handler 21 further determines if the SMI is caused by end of pass through, by examining the appropriate "SMI cause" bits in redirection register 88, step 184. If end of pass through is the SMI cause, SMI handler 21 performs steps 174 and 176 as described earlier.

At step 184, if the SMI is not caused by end of pass through, SMI handler 21 then services the SMI accordingly, depending on which of the prior art causes triggered the SMI, step 190. Finally, regardless of the service provided, upon servicing the SMI, as described earlier, SMI handler 21 causes processor 12 to resume its normal execution mode.

Thus, a method and apparatus for facilitating data I/O between a USB keyboard/pointing device and a non-USB cognition application has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An apparatus comprising:
    (a) first circuitry for monitoring interrupt triggering activities generated by a coupled universal serial bus (USB) compatible controller for the purpose of transferring data in from a USB compatible keyboard/pointing device, and in response, generating a first unmaskable transparent system management interrupt (SMI) for the purpose of redirecting the data in to a non-USB keyboard controller; and
    (b) second circuitry for monitoring reading/writing activities against predetermined ports of the non-USB keyboard controller by a coupled processor, and in response, generating a second unmaskable transparent SMI for the purpose of redirecting data out associated with the reading/writing to the USB compatible controller.

2. The apparatus as set forth in claim 1, wherein the first circuitry includes at least one circuit element for terminating the interrupt triggering activities generated by the coupled USB compatible controller.

3. The apparatus as set forth in claim 1, wherein the second circuitry includes
    a first trigger circuitry for monitoring for the reading/writing activities that are intended by the coupled processor for reading a predetermined port of the non-USB keyboard controller, and in response, generating the unmaskable transparent SMI,
    a second trigger circuitry for monitoring for the reading/writing activities that are intended by the coupled processor for writing to the predetermined port of the non-USB keyboard controller, and in response, generating the unmaskable transparent SMI.

4. The apparatus as set forth in claim 1, wherein the second circuitry includes
    a first trigger circuitry for monitoring for the reading/writing activities that are intended by the coupled processor for a predetermined one of a reading or a writing operation against a first predetermined port of the non-USB keyboard controller, and in response, generating the unmaskable transparent SMI,
    a second trigger circuitry for monitoring for the reading/writing activities that are intended by the coupled processor for the same predetermined reading/writing operation against a second predetermined port of the non-USB keyboard controller, and in response, generating the unmaskable transparent SMI.

5. The apparatus as set forth in claim 1, wherein the second circuitry includes a passthru mode of operation, under which generation of the unmaskable transparent SMI by the second circuitry is temporarily suspended, and the associated data are allowed to passthru to the non-USB keyboard controller.

6. The apparatus as set forth in claim 5, wherein the second circuitry include
   a state machine for operating the second circuitry in the passthru mode;
   a first trigger circuitry coupled to the state machine for monitoring for end of passthru operation, and in response, conditionally generating the unmaskable transparent SMI if a received necessity input signal denotes that it is necessary to generate the unmaskable transparent SMI.

7. The apparatus as set forth in claim 6, wherein the second circuitry further includes
   a second trigger circuitry coupled to the state machine for monitoring for the reading/writing activities that are intended by the coupled processor for reading a predetermined port of the non-USB keyboard controller, and in response, conditionally generating the unmaskable transparent SMI if the state machine has not placed the second circuitry in the passthru mode;
   a third trigger circuitry coupled to the state machine for monitoring for the reading/writing activities that are intended by the processor for writing to the predetermined port of the non-USB keyboard controller, and in response, conditionally generating the unmaskable transparent SMI if the state machine has not placed the second circuitry in the passthru mode.

8. The apparatus as set forth in claim 6, wherein the second circuitry includes
   a second trigger circuitry coupled to the state machine for monitoring for the reading/writing activities that are intended by the coupled processor for a predetermined one of a reading or a writing operation against a first predetermined port of the non-USB keyboard controller, and in response, conditionally generating the unmaskable transparent SMI if the state machine has not placed the second circuitry in the passthru mode;
   a third trigger circuitry coupled to the state machine for monitoring for the reading/writing activities that are intended by the coupled processor for the same predetermined reading/writing operation against a second predetermined port of the non-USB keyboard controller, and in response, conditionally generating the unmaskable transparent SMI if the state machine has not placed the second circuitry in passthru mode.

9. A computer bus bridge chipset comprising:
   (a) first circuitry for monitoring interrupt triggering activities generated by a coupled universal serial bus (USB) compatible controller for the purpose of transferring data in from a USB compatible keyboard or pointing device, and in response, generating a first unmaskable transparent system management interrupt (SMI) for the purpose of redirecting the data in to a non-USB keyboard controller; and
   (b) second circuitry for monitoring reading/writing activities for reading/writing against predetermined ports of the non-USB keyboard controller by a coupled processor, and in response, generating a second unmaskable transparent SMI for the purpose of redirecting data out associated with the second bus cycles to the USB compatible controller.

10. The computer bus bridge chipset as set forth in claim 9, wherein the first circuitry includes at least one circuit element for terminating the interrupt triggering activities.

11. The computer bus bridge chipset as set forth in claim 9, wherein the second circuitry includes
   a first trigger circuitry for monitoring for the reading/writing activities that are intended by the coupled processor for reading a predetermined port of the non-USB keyboard controller, and in response, generating the unmaskable transparent SMI,
   a second trigger circuitry for monitoring for the reading/writing activities that are intended by the coupled processor for writing to the predetermined port of the non-USB keyboard controller, and in response, generating the unmaskable transparent SMI.

12. The computer bus bridge chipset as set forth in claim 9, wherein the second circuitry includes
   a first trigger circuitry for monitoring for the reading/writing activities that are intended by the coupled processor for a predetermined one of a reading or a writing operation against a first predetermined port of the non-USB keyboard controller, and in response, generating the unmaskable transparent SMI,
   a second trigger circuitry for monitoring for the reading/writing activities that are intended by the coupled processor for the same predetermined reading/writing operation against a second predetermined port of the non-USB keyboard controller, and in response, generating the unmaskable transparent SMI.

13. The computer bus bridge chipset as set forth in claim 9, wherein the second circuitry includes a passthru mode of operation, under which generation of the unmaskable transparent SMI by the second circuitry is temporarily suspended, and the associated data are allowed to passthru to the non-USB keyboard controller.

14. The computer bus bridge chipset as set forth in claim 13, wherein the second circuitry include
   a state machine for operating the second circuitry in the passthru mode;
   a first trigger circuitry coupled to the state machine for monitoring for end of passthru operation, and in response, conditionally generating the unmaskable transparent SMI if a received necessity input signal denotes that it is necessary to generate the unmaskable transparent SMI.

15. The computer bus bridge chipset as set forth in claim 14, wherein the second circuitry includes
   a second trigger circuitry coupled to the state machine for monitoring for the reading/writing activities that are intended by the coupled processor for reading a predetermined port of the non-USB keyboard controller, and in response, conditionally generating the unmaskable transparent SMI if the state machine has not placed the second circuitry in the passthru mode;
   a third trigger circuitry coupled to the state machine for monitoring for the reading/writing activities that are intended by the coupled processor for writing to the predetermined port of the non-USB keyboard controller, and in response, conditionally generating the unmaskable transparent SMI if the state machine has not placed the second circuitry in the passthru mode.

16. The computer bus bridge chipset as set forth in claim 14, wherein the second circuitry includes a second trigger circuitry coupled to the state machine for monitoring for the reading/writing activities that are intended for a predetermined one of a reading or a writing operation against a first predetermined port of the non-USB keyboard controller, and in response, conditionally generating the unmaskable transparent SMI if the state machine has not placed the second circuitry in the passthru mode;

a third trigger circuitry coupled to the state machine for monitoring for the reading/writing activities that are intended by the processor for the same predetermined reading/writing operation against a second predetermined port of the non-USB keyboard controller, and in response, conditionally generating the unmaskable transparent SMI if the state machine has not placed the second circuitry in passthru mode.

17. An apparatus comprising:
(a) first circuitry for monitoring interrupt triggering activities generated by a coupled universal serial bus (USB) compatible controller for the purpose of transferring data in from a USB compatible keyboard/pointing device, and in response, generating a first unmaskable transparent system management interrupt (SMI) for the purpose of redirecting the data in to a non-USB keyboard controller, and for monitoring reading/writing activities against predetermined ports of the non-USB keyboard controller by a coupled processor, and in response, generating a second unmaskable transparent SMI for the purpose of redirecting data out associated with the reading/writing to the USB compatible controller; and
(b) second circuitry coupled to the first circuitry for temporarily operating the apparatus including the first circuitry in a passthru mode, under which generation of the unmaskable transparent SMI for reading/writing activities against predetermined ports of the non-USB keyboard controller by the coupled processor is temporarily suspended, and the associated data are allowed to passthru to the non-USB keyboard controller.

18. The apparatus as set forth in claim 17, wherein the second circuitry includes
a state machine for operating the apparatus including the first circuitry in the passthru mode;
a first trigger circuitry coupled to the state machine for monitoring for end of passthru operation, and in response, conditionally generating the unmaskable transparent SMI if a received necessity input signal denotes that it is necessary to generate the unmaskable transparent SMI.

19. A computer bus bridge chipset comprising:
(a) first circuitry for monitoring interrupt triggering activities generated by a coupled universal serial bus (USB) compatible controller for the purpose of transferring data in from a USB compatible keyboard/pointing device, and in response, generating a first unmaskable transparent system management interrupt (SMI) for the purpose of redirecting the data in to a non-USB keyboard controller, and for monitoring reading/writing activities against predetermined ports of the non-USB keyboard controller by a coupled processor, and in response, generating a second unmaskable transparent SMI for the purpose of redirecting data out associated with the reading/writing to the USB compatible controller; and
(b) second circuitry coupled to the first circuitry for temporarily operating the apparatus including the first circuitry in a passthru mode, under which generation of the unmaskable transparent SMI for reading/writing activities against predetermined ports of the non-USB keyboard controller by the coupled processor is temporarily suspended, and the associated data are allowed to passthru to the non-USB keyboard controller.

20. The computer bus bridge chipset as set forth in claim 19, wherein the second circuitry includes
a state machine for operating the apparatus including the first circuitry in the passthru mode;
a first trigger circuitry coupled to the state machine for monitoring for end of passthru operation, and in response, conditionally generating the unmaskable transparent SMI if a received necessity input signal denotes that it is necessary to generate the unmaskable transparent SMI.

21. An apparatus comprising:
(a) first circuitry for monitoring interrupt triggering activities generated by a coupled universal serial bus (USB) compatible controller for the purpose of transferring data in from a USB compatible keyboard/pointing device, and in response, generating a first unmaskable transparent system management interrupt (SMI) for the purpose of redirecting the data in to a non-USB keyboard controller; and
(b) second circuitry for shutting off the interrupt triggering activities generated by the USB compatible controller thereby preventing said interrupt triggering activities from being further responded to.

22. A computer bus bridge chipset comprising:
(a) first circuitry for monitoring interrupt triggering activities generated by a coupled universal serial bus (USB) compatible controller for the purpose of transferring data in from a USB compatible keyboard/pointing device, and in response, generating a first unmaskable transparent system management interrupt (SMI) for the purpose of redirecting the data in to a non-USB keyboard controller; and
(b) second circuitry for shutting off the interrupt triggering activities generated by the USB compatible controller thereby preventing said interrupt triggering activities from being further responded to.

23. An apparatus comprising:
(a) first circuitry for monitoring reading/writing activities against a first predetermined port of a non-USB keyboard controller by a coupled processor, and in response, generating a first unmaskable transparent SMI for the purpose of redirecting data out associated with the reading/writing activities to a universal serial bus (USB) compatible keyboard/pointing device through a coupled USB compatible controller; and
(b) second circuitry for monitoring reading/writing activities against a second predetermined port of a non-USB keyboard controller by a coupled processor, and in response, generating a second unmaskable transparent SMI for the purpose of redirecting data out associated with the reading/writing activities to the USB compatible keyboard/pointing device through the coupled USB compatible controller.

24. A computer bus bridge chipset comprising:
(a) first circuitry for monitoring reading/writing activities against a first predetermined port of a non-universal serial bus (USB keyboard controller by a coupled processor, and in response, generating a first unmaskable transparent SMI for the purpose of redirecting data out associated with the reading/writing activities to an USB compatible keyboard/pointing device through a coupled USB compatible controller; and (b) second circuitry for monitoring reading/writing activities against a second predetermined port of a non-USB keyboard controller by a coupled processor, and in response, generating a second unmaskable transparent SMI for the purpose of redirecting data out associated with the reading/writing activities to the USB compatible keyboard/pointing device through the coupled USB compatible controller.

25. A computer system comprising:

(a) first circuitry for monitoring interrupt triggering activities generated by a coupled universal serial bus (USB) compatible controller for the purpose of transferring data in from a USB compatible keyboard/pointing device, and in response, generating a first unmaskable transparent system management interrupt (SMI) for the purpose of redirecting the data in to a non-USB keyboard controller, and for monitoring reading/writing activities against predetermined ports of the non-USB keyboard controller by a coupled processor, and in response, generating a second unmaskable transparent SMI for the purpose of redirecting data out associated with the reading/writing activities to the USB compatible controller; and (b) a SMI handler for redirecting the data in to the non-USB keyboard controller in response to the first unmaskable transparent SMI, and redirecting data out associated with the reading/writing activities to the USB compatible controller in response to the second unmaskable transparent SMI.

26. The computer system as set forth in claim 25, wherein the SMI handler includes first logic for reading the data in from a working memory area of the USB compatible controller, and writing the data in into at least one predetermined ports of the non-USB keyboard controller in a manner that simulates the data in being received by the non-USB keyboard controller from an actually coupled keyboard/pointing device; and second logic for reading the data out from an I/O buffer, and writing the data out into the working memory area of the USB compatible controller.

27. The computer system as set forth in claim 26, wherein the SMI handler further includes third logic for determining whether a data passthru operation to the non-USB keyboard controller is in progress, and preventing said first logic from performing said writing into said non-USB keyboard controller if said determination is affirmative; and fourth logic for marking the necessity of regenerating another unmaskabke transparent SMI at the end of the passthru operation, and resuming the computer system in normal operation.

28. In a computer system, a computer implemented method for facilitating data input/output (I/O) between a universal serial bus (USB) compatible keyboard/pointing device and a non-USB cognition application, the computer implemented method comprising the steps of:

(a) monitoring interrupt triggering activities generated by a coupled universal serial bus (USB) compatible controller for the purpose of transferring data in from the USB compatible keyboard/pointing device, and in response, generating a first unmaskable transparent system management interrupt (SMI);

(b) redirecting the data in to a non-USB keyboard controller, in response to the first unmaskable transparent SMI;

(c) monitoring for reading/writing activities against predetermined ports of the non-USB keyboard controller generated by a coupled processor, and in response, generating a second unmaskable transparent SMI; and (d) redirecting data out associated with the reading/writing activities to the USB compatible controller, in response to the second unmaskable transparent SMI.

29. The computer implemented method as set forth in claim 28, wherein step (b) comprises reading the data in from a working memory area of the USB compatible controller, and writing the data in into at least one predetermined ports of the non-USB keyboard controller in a manner that simulates the data in being received by the non-USB keyboard controller from an actually coupled keyboard/pointing device; and step (d) comprises reading the data out from an I/O buffer, and writing the data out into the working memory area of the USB compatible controller.

30. The computer implemented method as set forth in claim 29, wherein step (b) further comprises determining whether a data passthru operation to the non-USB keyboard controller is in progress, and skipping said reading from said working memory area of said USB compatible controller and said writing into said non-USB keyboard controller if said determination is affirmative; and in lieu of said skipped steps, said step (b) further comprises the steps of marking the necessity of regenerating another unmaskabke transparent SMI at the end of the passthru operation, and resuming the computer system in normal operation.

31. An apparatus comprising:

(a) first circuitry for monitoring interrupt triggering activities generated by a coupled serial bus compatible controller for the purpose of transferring data in from a serial bus compatible input device, and in response, generating a first alternate unmaskable interrupt for the purpose of redirecting the data in to a non-serial bus input controller; and (b) second circuitry for monitoring reading/writing activities against predetermined ports of the non-serial bus input controller by a coupled processor, and in response, generating a second alternate unmaskable interrupt for the purpose of redirecting data out associated with the reading/writing to the serial bus compatible controller.

32. An apparatus comprising:

(a) first circuitry for monitoring interrupt triggering activities generated by a coupled serial bus compatible controller for the purpose of transferring data in from a serial bus compatible input device, and in response, generating a first alternate unmaskable interrupt for the purpose of redirecting the data in to a non-serial bus input controller, and for monitoring reading/writing activities against predetermined ports of the non-serial bus input controller by a coupled processor, and in response, generating a second alternate unmaskable interrupt for the purpose of redirecting data out associated with the reading/writing to the serial bus compatible controller; and (b) second circuitry coupled to the first circuitry for temporarily operating the apparatus including the first circuitry in a passthru mode, under which generation of the second alternate unmaskable interrupt for reading/writing activities against predetermined ports of the non-serial bus input controller by the coupled processor is temporarily suspended, and the associated data are allowed to passthru to the non-serial bus input controller.

33. An apparatus comprising:
(a) first circuitry for monitoring interrupt triggering activities generated by a coupled serial bus compatible controller for the purpose of transferring data in from a serial bus compatible input device, and in response, generating a first alternate unmaskable interrupt for the purpose of redirecting the data in to a non-serial bus input controller; and
(b) second circuitry for shutting off the interrupt triggering activities generated by the serial bus compatible controller thereby preventing said interrupt triggering activities from being further responded to.

34. An apparatus comprising:
(a) first circuitry for monitoring reading/writing activities against a first predetermined port of a non-serial bus input controller by a coupled processor, and in response, generating a first alternate unmaskable interrupt for the purpose of redirecting data out associated with the reading/writing activities to a serial bus compatible input device through a coupled serial bus compatible controller; and
(b) second circuitry for monitoring reading/writing activities against a second predetermined port of a non-serial bus input controller by a coupled processor, and in response, generating a second alternate unmaskable interrupt for the purpose of redirecting data out associated with the reading/writing activities to the serial bus compatible input device through the coupled serial bus compatible controller.

35. A computer system comprising:
(a) first circuitry for monitoring interrupt triggering activities generated by a coupled serial bus compatible controller for the purpose of transferring data in from a serial bus compatible input device, and in response, generating a first alternate unmaskable t interrupt for the purpose of redirecting the data in to a non-serial bus input controller, and for monitoring reading/writing activities against predetermined ports of the non-serial bus input controller by a coupled processor, and in response, generating a second alternate unmaskable interrupt for the purpose of redirecting data out associated with the reading/writing activities to the serial bus compatible controller; and
(b) an interrupt handler for redirecting the data in to the non-serial bus input controller in response to the first alternate unmaskable interrupt, and redirecting data out associated with the reading/writing activities to the serial bus compatible controller in response to the second alternate unmaskable interrupt.

* * * * *